US012368636B2

(12) United States Patent
Miao et al.

(10) Patent No.: US 12,368,636 B2
(45) Date of Patent: Jul. 22, 2025

(54) PORT CONFIGURATION METHOD AND DEVICE

(71) Applicant: Spreadtrum Semiconductor (Nanjing) Co., Ltd., Nanjing (CN)

(72) Inventors: Runqua Miao, Nanjing (CN); Sa Zhang, Nanjing (CN); Dawei Ma, Nanjing (CN)

(73) Assignee: Spreadtrum Semiconductor (Nanjing) Co., Ltd., Nanjing (CN)

( * ) Notice: Subject to any disclaimer, the term of this patent is extended or adjusted under 35 U.S.C. 154(b) by 683 days.

(21) Appl. No.: 17/422,140

(22) PCT Filed: Jan. 7, 2020

(86) PCT No.: PCT/CN2020/070650
§ 371 (c)(1),
(2) Date: Aug. 22, 2022

(87) PCT Pub. No.: WO2020/143609
PCT Pub. Date: Jul. 16, 2020

(65) Prior Publication Data
US 2022/0400050 A1 Dec. 15, 2022

(30) Foreign Application Priority Data
Jan. 11, 2019 (CN) .......................... 201910028645.9

(51) Int. Cl.
*H04L 41/0803* (2022.01)
*H04B 7/04* (2017.01)
(Continued)

(52) U.S. Cl.
CPC .......... *H04L 41/0803* (2013.01); *H04B 7/04* (2013.01); *H04L 5/0048* (2013.01);
(Continued)

(58) Field of Classification Search
CPC . H04L 41/0803; H04L 5/0048; H04L 5/0053; H04W 72/51; H04W 72/23; H04B 7/04
See application file for complete search history.

(56) References Cited

U.S. PATENT DOCUMENTS 9,572,197 B1\* 2/2017 Wurtenberger ....... H04W 72/04
2018/0159673 A1\* 6/2018 Wang .................. H04B 17/309
(Continued)

FOREIGN PATENT DOCUMENTS

CN 102158302 A 8/2011
CN 108632193 A 10/2018
(Continued)

OTHER PUBLICATIONS

3GPP, "3rd Generation Partnership Project" Technical Specification, 3GPP TS 38.212 version 15.3.0 Release 15, Sep. 2018, Sophia Antipolis Valbonne, France.
(Continued)

*Primary Examiner* — Michael J Moore, Jr.
(74) *Attorney, Agent, or Firm* — WOMBLE BOND DICKINSON (US) LLP

(57) ABSTRACT

The present disclosure relates to a port configuration method and device, the method comprises: receiving antenna port configuration parameters, the antenna port configuration parameters being adapted to information on transmission capability of a terminal; and determining an association relationship set between port selection parameters and demodulation reference signal DMRS port identifiers according to the antenna port configuration parameters. The present disclosure determines the association relationship set adapted to the transmission capability of the terminal by using the antenna port configuration parameters sent by a base station, and obtains the DMRS port in accordance with the determined antenna port data so as to configure the port, thereby avoiding blind configuration on the port of the
(Continued)

terminal, improving efficiency of the terminal configuration, and reducing signaling overhead of the configuration.

17 Claims, 6 Drawing Sheets

(51) Int. Cl.
*H04L 5/00* (2006.01)
*H04W 72/23* (2023.01)
*H04W 72/51* (2023.01)

(52) U.S. Cl.
CPC .......... *H04L 5/0053* (2013.01); *H04W 72/23* (2023.01); *H04W 72/51* (2023.01)

(56) References Cited

U.S. PATENT DOCUMENTS

| | | | |
|---|---|---|---|
| 2018/0375629 A1 | 12/2018 | Lee et al. | |
| 2020/0022120 A1* | 1/2020 | Liu | H04B 7/0473 |
| 2021/0014931 A1* | 1/2021 | Noh | H04L 5/0035 |
| 2021/0243777 A1* | 8/2021 | Tsai | H04W 74/006 |
| 2022/0400050 A1* | 12/2022 | Miao | H04B 7/063 |

FOREIGN PATENT DOCUMENTS

| | | | | |
|---|---|---|---|---|
| CN | 108809575 A | | 11/2018 | |
| CN | 108809609 A | | 11/2018 | |
| EP | 3220679 B1 * | | 1/2019 | ............ H04B 7/024 |
| JP | 2017005665 A | | 1/2017 | |
| KR | 10-2015-0131369 A | | 11/2015 | |
| WO | 2012151875 A1 | | 11/2012 | |
| WO | 2014113971 A1 | | 7/2014 | |
| WO | 2017090708 A1 | | 6/2017 | |
| WO | WO-2018010478 A1 * | | 1/2018 | ........... H04B 7/0452 |
| WO | WO-2018176002 A1 * | | 9/2018 | ........... H04B 7/0452 |

OTHER PUBLICATIONS

ETSI, "5G; NR; Multiplexing and channel coding," Technical Specification, 3GPP TS 38.212 version 15.2.0 Release 15, Jul. 2018, Sophia Antipolis Cedex, France.

3GPP, "LS on MIMO layer configuration," document No. R2-1816065, 3GPP TSG RAN WG1 Meeting #95, Oct. 8-12, 2018, Chengdu, China.

Ericsson, "Remaining details on DMRS design," document No. R1-1718448, 3GPP TSG RAN WG1 Meeting 90bis, agenda item 7.2.3.3, Oct. 9-13, 2017, Prague, CZ.

3GPP, " 3rd Generation Partnership Project; Technical Specification Group Radio Access Network; NR; Multiplexing and channel coding (Release 15)", Technical Specification, 3GPP TS 38.212 version 15.4.0 (Dec. 2018), Valbonne, France (100 pages).

Office Action mailed Mar. 24, 2025, in the corresponding Korean Patent Application No. 10-2021-7025432, with English translation (11 pages).

3GPP, "Remaining details on DMRS", Discussion and Decision, Samsung, 3GPP TSG RAN WG1 Meeting 90bis, R1-1717630 (Oct. 2017), Prague, Czech Republic (10 pages).

* cited by examiner

PORT CONFIGURATION METHOD AND DEVICE

CROSS-REFERENCE

This application is a U.S. national stage application of the PCT International Application No. PCT/CN2020/070650 filed on Jan. 7, 2020, which claims priority to Chinese Application No. 201910028645.9 filed on Jan. 11, 2019, both of which are incorporated herein by reference.

TECHNICAL FIELD

The present disclosure relates to the technical field of communication, and in particular to a port configuration method and device.

BACKGROUND

In a communication system, when a terminal establishes a connection with a base station, it is necessary to configure an antenna port. In a related art, when configuring an antenna port, a complete downlink port configuration table is usually employed. In this way, in the related art configuration on an antenna port of a UE can be completed. However, in the related art, since a complete downlink port configuration table is employed when configuring the antenna port, a large amount of configuration signaling will be occupied and transmission resources are wasted.

SUMMARY

According to an aspect of the present disclosure, there is provided a port configuration method, comprising: receiving antenna port configuration parameters, the antenna port configuration parameters being adapted to transmission capability information of a terminal; and determining, according to the antenna port configuration parameters, an association relationship set between port selection parameters and demodulation reference signal (DMRS) port identifiers.

According to another aspect of the present disclosure, there is provided a port configuration method comprising:
  receiving apparatus information, the apparatus information including an apparatus type of a terminal and transmission capability information of the terminal; setting antenna port configuration parameters for the terminal according to the apparatus information, where the antenna port configuration parameters being adapted to the transmission capability information of the terminal; and sending the antenna port configuration parameters.

According to another aspect of the present disclosure, there is provided a port configuration device comprising: a processor; and a memory configured to store computer instructions, wherein the computer instructions cause the processor to: receive antenna port configuration parameters, the antenna port configuration parameters being adapted to transmission capability information of a terminal; and determine, according to the antenna port configuration parameters, an association relationship set between port selection parameters and demodulation reference signal (DMRS) port identifiers.

According to another aspect of the present disclosure, there is provided a non-transitory computer readable storage medium having stored thereon computer program instructions, wherein the computer program instructions cause a processor to: receive antenna port configuration parameters, the antenna port configuration parameters being adapted to transmission capability information of a terminal; and determine, according to the antenna port configuration parameters, an association relationship set between port selection parameters and demodulation reference signal (DMRS) port identifiers.

BRIEF DESCRIPTION OF THE DRAWINGS

The accompanying drawings, which are incorporated in and constitute a part of the specification, illustrate exemplary embodiments, features, and aspects of the present disclosure and, together with the description, serve to explain the principles of the present disclosure.

DETAILED DESCRIPTION

Figure 1:
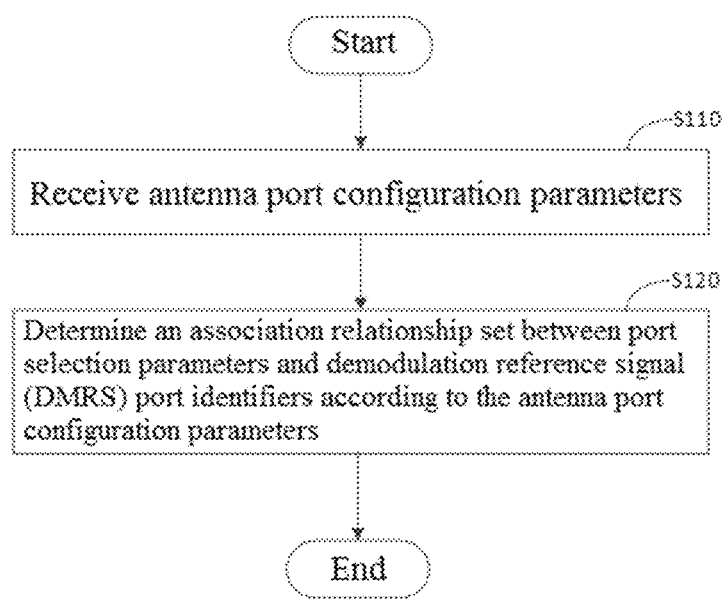
FIG. 1 shows a flowchart of a port configuration method according to an embodiment of the present disclosure.

Various exemplary embodiments, features, and aspects of the present disclosure will be described in detail hereinafter with reference to the accompanying drawings. The same reference numerals in the drawings denote elements having the same or similar functions. Although various aspects of the embodiment are shown in the drawings, the drawings are not necessarily to drawn to scale unless otherwise specified.

The special term "exemplary" here means "serving as an example, an embodiment, or an illustration". Any embodiment described herein as "exemplary" need not be construed as being superior or better than other embodiments.

In addition, in the following detailed embodiments, numerous specific details are set forth in order to better explain the present disclosure. Those skilled in the art will understand that, the present disclosure may also be practiced without certain specific details. In some instances, those methods, means, elements, and circuits known to those skilled in the art are not described in detail in order to highlight the gist of the present disclosure.

Referring to FIG. 1, a flowchart of a port configuration method according to an embodiment of the present disclosure is shown.

The method may be applied to a terminal, which may include a User Equipment (UE), for example, a mobile terminal such as a mobile phone, a tablet computer, and so on. As shown in FIG. 1, the method comprises:

S110: receiving antenna port configuration parameters, the antenna port configuration parameters being adapted to transmission capability information of a terminal;

S120: determining, according to the antenna port configuration parameters, an association relationship set between port selection parameters and demodulation reference signal (DMRS) port identifiers.)

By the above method, after receiving the antenna port configuration parameters sent by the base station, the present disclosure determines, according to the antenna port configuration parameters, an association relationship set pre-stored in a terminal and adapted to a transmission capability of the terminal, so that a DMRS port identifier in the association relationship set can be determined after receiving the target port selection parameter sent by the base station, and an antenna port of the terminal can be configured using the DMRS port number. The present disclosure determines an association relationship set adapted to the transmission capability of the terminal from the antenna port configuration parameters sent by the base station, and acquires a DMRS port identifier according to the determined antenna port data for configuring the port, thereby avoiding a blind configuration on the port of the terminal, improving efficiency of the terminal configuration, and reducing signaling overhead for the configuration.

Optionally, a transmission capability of the terminal may refer to a maximum number of transport streams (a maximum number of transport layers) for the terminal.

Optionally, the antenna port configuration parameters may include a demodulation reference signal type (DMRS-Type) parameter, a demodulation reference signal maximum OFDM symbol length parameter (maxLength), a number-of-transport-stream configuration parameter (maxRank), and so on, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams for the terminal;

wherein the antenna port configuration parameters are configured by the base station according to apparatus information of the terminal, and are used to select an association relationship set adapted to the transmission capability of the terminal.

Optionally, the apparatus information may include a type of the terminal, such as Type A, Type B, and so on, and the terminals may be classified into different types according to different protocols supported by the terminals. The apparatus information may further include a maximum number of transport streams supported by the terminal.

Optionally, the association relationship set may be pre-configured in the terminal and the base station, and at least a corresponding relationship between the port selection parameter and the DMRS port number is recorded in the association relationship set. A specific form of the association relationship set is not limited in the present disclosure. For example, the association relationship set may be in the form of a table.

For example, when a value of the demodulation reference signal type parameter is 1, a value of the demodulation reference signal maximum OFDM symbol length parameter is 1, and a value of the number-of-transport-stream configuration parameter is 1, the association relationship set may be as shown in Table 1.

TABLE 1

| port selection parameter | DMRS port number |
| --- | --- |
| 0 | 0 |
| 1 | 1 |
| 2 | 0 |
| 3 | 1 |
| 4 | 2 |
| 5 | 3 |
| 6-7 | reserved |

When the value of the demodulation reference signal type parameter is 1, the value of the demodulation reference signal maximum OFDM symbol length parameter is 1, and the value of the number-of-transport-stream configuration parameter is one of 2, 3 and 4, the association relationship set may be as shown in Table 2.

TABLE 2

| port selection parameter | DMRS port number |
| --- | --- |
| 0 | 0 |
| 1 | 1 |
| 2 | 0, 1 |
| 3 | 0 |
| 4 | 1 |
| 5 | 2 |
| 6 | 3 |
| 7 | 0, 1 |
| 8 | 2, 3 |
| 9 | 0-2 |
| 10 | 0-3 |
| 11 | 0, 2 |
| 12-15 | reserved |

When the value of the demodulation reference signal type parameter is 1, the value of the demodulation reference signal maximum OFDM length parameter is 2, and the value of the number-of-transport-stream configuration parameter is 1, the association relationship set may be as shown in Table 3.

TABLE 3

| port selection parameter | DMRS port number |
| --- | --- |
| 0 | 0 |
| 1 | 1 |
| 2 | 0 |
| 3 | 1 |
| 4 | 2 |
| 5 | 3 |
| 6 | 0 |
| 7 | 1 |
| 8 | 2 |
| 9 | 3 |
| 10 | 4 |
| 11 | 5 |
| 12 | 6 |
| 13 | 7 |
| 14-15 | reserved |

When the value of the demodulation reference signal type parameter is 1, the value of the demodulation reference signal maximum OFDM symbol length parameter is 2, and the value of the number-of-transport-stream configuration parameter is one of 2, 3, 4, 5, 6, 7 and 8, the association relationship set may be as shown in Table 4.

TABLE 4

| codeword 1 | | codeword 2 | |
|---|---|---|---|
| port selection parameter | DMRS port number | port selection parameter | DMRS port number |
| 0 | 0 | 0 | 0-4 |
| 1 | 1 | 1 | 0, 1, 2, 3, 4, 6 |
| 2 | 0, 1 | 2 | 0, 1, 2, 3, 4, 5, 6 |
| 3 | 0 | 3 | 0, 1, 2, 3, 4, 5, 6, 7 |
| 4 | 1 | 4-31 | reserved |
| 5 | 2 | | |
| 6 | 3 | | |
| 7 | 0, 1 | | |
| 8 | 2, 3 | | |
| 9 | 0-2 | | |
| 10 | 0-3 | | |
| 11 | 0, 2 | | |
| 12 | 0 | | |
| 13 | 1 | | |
| 14 | 2 | | |
| 15 | 3 | | |
| 16 | 4 | | |
| 17 | 5 | | |
| 18 | 6 | | |
| 19 | 7 | | |
| 20 | 0, 1 | | |
| 21 | 2, 3 | | |
| 22 | 4, 5 | | |
| 23 | 6, 7 | | |
| 24 | 0, 4 | | |
| 25 | 2, 6 | | |
| 26 | 0, 1, 4 | | |
| 27 | 2, 3, 6 | | |
| 28 | 0, 1, 4, 5 | | |
| 29 | 2, 3, 6, 7 | | |
| 30 | 0, 2, 4, 6 | | |
| 31 | reserved | | |

When the value of the demodulation reference signal type parameter is 2, the value of the demodulation reference signal maximum OFDM symbol length parameter is 1, and the value of the number-of-transport-stream configuration parameter is 1, the association relationship set may be as shown in Table 5.

TABLE 5

| port selection parameter | DMRS port number |
|---|---|
| 0 | 0 |
| 1 | 1 |
| 2 | 0 |
| 3 | 1 |
| 4 | 2 |
| 5 | 3 |
| 6 | 0 |
| 7 | 1 |
| 8 | 2 |
| 9 | 3 |
| 10 | 4 |
| 11 | 5 |
| 12-15 | reserved |

When the value of the demodulation reference signal type parameter is 2, the value of the demodulation reference signal maximum OFDM symbol length parameter is 1, and the value of the number-of-transport-stream configuration parameter is one of 2, 3, 4, 5, 6, 7 and 8, the association relationship set may be as shown in Table 6.

TABLE 6

| codeword 3 | | codeword 4 | |
|---|---|---|---|
| port selection parameter | DMRS port number | port selection parameter | DMRS port number |
| 0 | 0 | 0 | 0-4 |
| 1 | 1 | 1 | 0-5 |
| 2 | 0, 1 | 2-31 | reserved |
| 3 | 0 | | |
| 4 | 1 | | |
| 5 | 2 | | |
| 6 | 3 | | |
| 7 | 0, 1 | | |
| 8 | 2, 3 | | |
| 9 | 0-2 | | |
| 10 | 0-3 | | |
| 11 | 0 | | |
| 12 | 1 | | |
| 13 | 2 | | |
| 14 | 3 | | |
| 15 | 4 | | |
| 16 | 5 | | |
| 17 | 0, 1 | | |
| 18 | 2, 3 | | |
| 19 | 4, 5 | | |
| 20 | 0-2 | | |
| 21 | 3-5 | | |
| 22 | 0-3 | | |
| 23 | 0, 2 | | |
| 24-31 | Reserved | | |

When the value of the demodulation reference signal type parameter is 2, the value of the demodulation reference signal maximum OFDM symbol length parameter is 2, and the value of the number-of-transport-stream configuration parameter is 1, the association relationship set may be as shown in Table 7.

TABLE 7

| port selection parameter | DMRS port number |
|---|---|
| 0 | 0 |
| 1 | 1 |
| 2 | 0 |
| 3 | 1 |
| 4 | 2 |
| 5 | 3 |
| 6 | 0 |
| 7 | 1 |
| 8 | 2 |
| 9 | 3 |
| 10 | 4 |
| 11 | 5 |
| 12 | 0 |
| 13 | 1 |
| 14 | 2 |
| 15 | 3 |
| 16 | 4 |
| 17 | 5 |
| 18 | 6 |
| 19 | 7 |
| 20 | 8 |
| 21 | 9 |
| 22 | 10 |
| 23 | 11 |
| 24 | 0 |
| 25 | 1 |
| 26 | 6 |
| 27 | 7 |
| 28-31 | reserved |

When the value of the demodulation reference signal type parameter is 2, the value of the demodulation reference signal maximum OFDM symbol length parameter is 2, and the value of the number-of-transport-stream configuration parameter is one of 2, 3, 4, 5, 6, 7 and 8, the association relationship set may be as shown in Table 8.

TABLE 8

| codeword a | | codeword b | |
|---|---|---|---|
| port selection parameter | DMRS port number | port selection parameter | DMRS port number |
| 0 | 0 | 0 | 0-4 |
| 1 | 1 | 1 | 0-5 |
| 2 | 0, 1 | 2 | 0, 1, 2, 3, 6 |
| 3 | 0 | 3 | 0, 1, 2, 3, 6, 8 |
| 4 | 1 | 4 | 0, 1, 2, 3, 6, 7, 8 |
| 5 | 2 | 5 | 0, 1, 2, 3, 6, 7, 8, 9 |
| 6 | 3 | 6-63 | Reserved |
| 7 | 0, 1 | | |
| 8 | 2, 3 | | |
| 9 | 0-2 | | |
| 10 | 0-3 | | |
| 11 | 0 | | |
| 12 | 1 | | |
| 13 | 2 | | |
| 14 | 3 | | |
| 15 | 4 | | |
| 16 | 5 | | |
| 17 | 0, 1 | | |
| 18 | 2, 3 | | |
| 19 | 4, 5 | | |
| 20 | 0-2 | | |
| 21 | 3-5 | | |
| 22 | 0-3 | | |
| 23 | 0, 2 | | |
| 24 | 0 | | |
| 25 | 1 | | |
| 26 | 2 | | |
| 27 | 3 | | |
| 28 | 4 | | |
| 29 | 5 | | |
| 30 | 6 | | |
| 31 | 7 | | |
| 32 | 8 | | |
| 33 | 9 | | |
| 34 | 10 | | |
| 35 | 11 | | |
| 36 | 0, 1 | | |
| 37 | 2, 3 | | |
| 38 | 4, 5 | | |
| 39 | 6, 7 | | |
| 40 | 8, 9 | | |
| 41 | 10, 11 | | |
| 42 | 0, 1, 6 | | |
| 43 | 2, 3, 8 | | |
| 44 | 4, 5, 10 | | |
| 45 | 0, 1, 6, 7 | | |
| 46 | 2, 3, 8, 9 | | |
| 47 | 4, 5, 10, 11 | | |
| 48 | 0 | | |
| 49 | 1 | | |
| 50 | 6 | | |
| 51 | 7 | | |
| 52 | 0, 1 | | |
| 53 | 6, 7 | | |
| 54 | 0, 1 | | |
| 55 | 2, 3 | | |
| 56 | 6, 7 | | |
| 57 | 8, 9 | | |
| 58-63 | Reserved | | |

It can be seen from Table 1 to Table 8 that, different antenna port configuration parameters may correspond to different association relationship sets, and a DMRS port may be selected from an association relationship set adapted to the transmission capability of the terminal according to a target port selection parameter indicated by the base station, so as to configure an antenna port of the terminal.

It should be understood that the above description on the association relationship set is exemplary, and the present disclosure does not limit the form of the association relationship set. And the DMRS port number corresponding to the port selection parameter may be other, which is not limited by the present disclosure.

Figure 2:
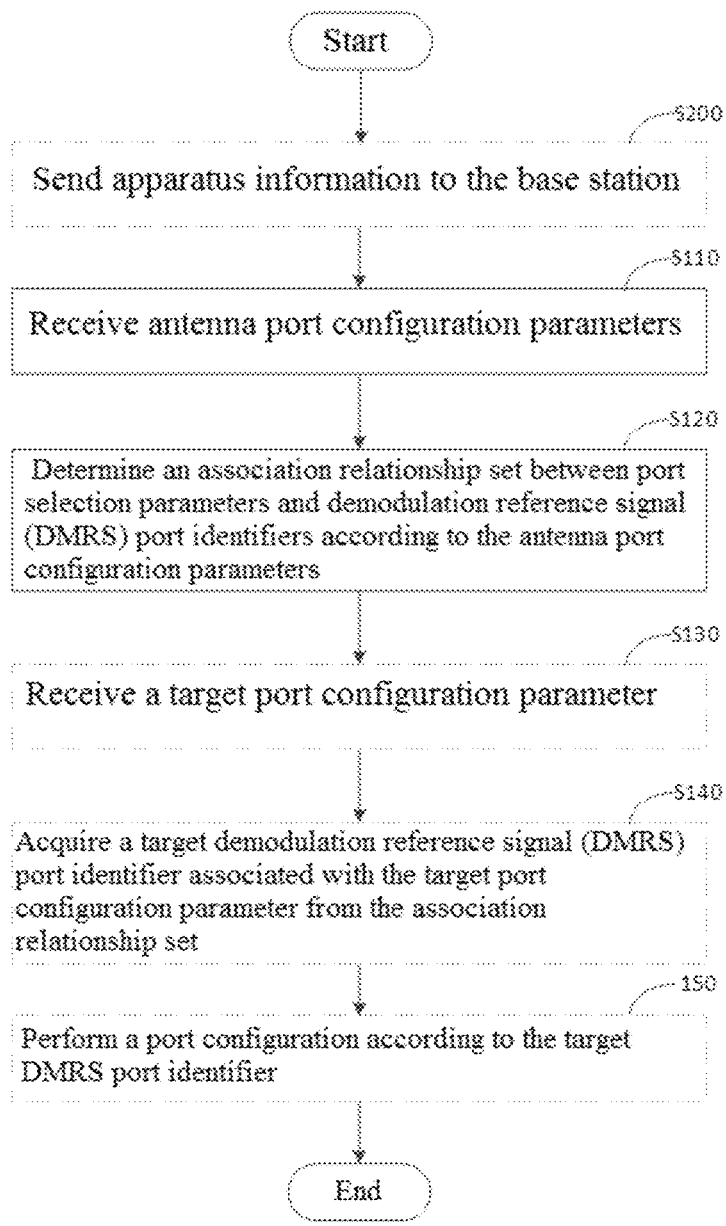
FIG. 2 shows a flowchart of a port configuration method according to an embodiment of the present disclosure.

Referring to FIG. 2, a flowchart of a port configuration method according to an embodiment of the present disclosure is shown.

Optionally, as shown in FIG. 2, after determining, according to the antenna port configuration parameters, the association relationship set between the port selection parameters and the demodulation reference signal (DMRS) port identifiers, the method further comprises:

S130: receiving a target port configuration parameter;

S140: acquiring a target demodulation reference signal (DMRS) port identifier associated with the target port configuration parameter from the association relationship set;

S150: performing a port configuration according to the target DMRS port identifier.

As can be seen from Table 1 to Table 8 introduced above, the port selection parameters are in a one-to-one correspondence with the DMRS port numbers. Therefore, when the association relationship set is determined through the antenna port configuration parameters, the corresponding DMRS port number can be acquired according to the target port selection parameter so as to set the port.

In S200, apparatus information is sent to the base station, the apparatus information including an apparatus type of the terminal and transmission capability information of the terminal.

Optionally, the base station configures the terminal with the antenna port configuration parameters and the target port selection parameter according to the apparatus information.

Optionally, when the base station receives the apparatus information, the antenna port configuration parameters for the terminal and the target port selection parameter for the terminal may be configured according to the apparatus information.

In this way, an adaptive configuration of the terminal can be realized.

Optionally, S110 of receiving the antenna port configuration parameters sent by the base station may comprise:

receiving radio resource control signaling, the radio resource control signaling including the antenna port configuration parameters.

Optionally, receiving the target port configuration parameter may comprise:

receiving downlink control information, the downlink control information including the target port selection parameter.

Optionally, the base station may establish an RRC connection with the terminal and send the antenna port configuration parameters to the terminal through the RRC.

Optionally, the base station may send the target port selection parameter to the terminal through DCI.

In this embodiment, the target port selection parameter is a binary data of a number of bits greater than or equal to 1 and less than or equal to 6. For example, 001, 010, 011, 1111, etc., and these data correspond to binary data which can be natural numbers such as 1, 2, 3, . . . .

In the related art, when the base station configures the port of the terminal, the base station configures all the layers that the terminal may support in the protocol. For example, when the maximum number of transport layers that the terminal may support in the protocol is 8, the related art configures all the 1-8 layers without considering the capability of a specific terminal. In this case, the target port selection parameter sent by the base station to the terminal through the DCI will correspond to the 1-8 layers, and will occupy a large amount of data bits of the DCI, causing a large amount of signaling overheads and wasting resources.

The present disclosure can reduce signaling overhead by adaptively configuring a port of a terminal.

Figure 3:
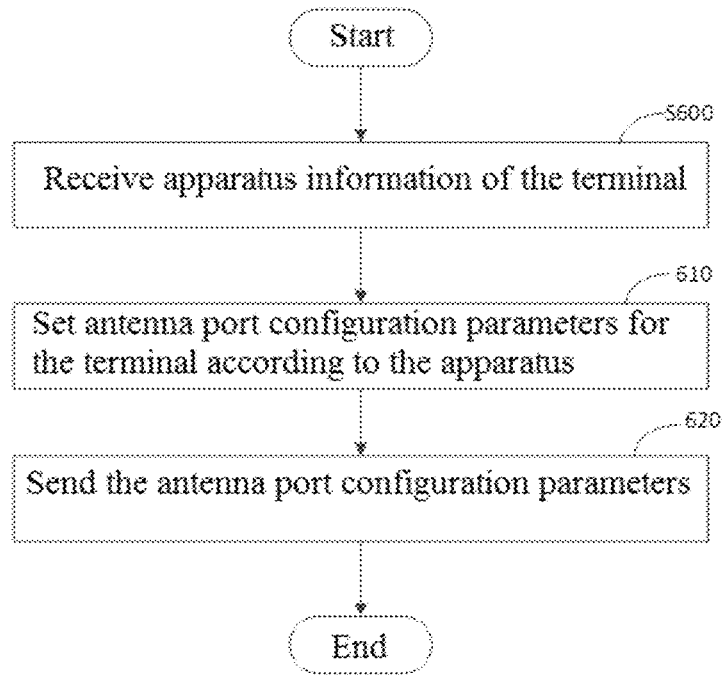
FIG. 3 shows a flowchart of a port configuration method according to an embodiment of the present disclosure.

Referring to FIG. 3, a flowchart of a port configuration method according to an embodiment of the present disclosure is shown. The method may be applied to a base station, the method comprising:

S600: receiving apparatus information of a terminal, the apparatus information including an apparatus type of the terminal and transmission capability information of the terminal;

S610: setting antenna port configuration parameters for the terminal according to the apparatus information, the antenna port configuration parameters being adapted to the transmission capability information of the terminal;

step 620: sending the antenna port configuration parameters.

By the above method, the base station described in the present disclosure can configure the antenna port configuration parameters for the terminal and a target port selection parameter for the terminal according to the apparatus information of the terminal, so as to configure the antenna port of the terminal.

Optionally, the transmission capability may be a maximum number of transport streams of the terminal.

Optionally, the antenna port configuration parameters include a demodulation reference signal type parameter, a demodulation reference signal maximum OFDM symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams of the terminal;

wherein the antenna port configuration parameters are used by the terminal to select an association relationship set adapted to the transmission capability of the terminal.

Optionally, sending the antenna port configuration parameters and the port selection parameter to the terminal according to the apparatus information comprises:

sending the antenna port configuration parameters through radio resource control signaling;

sending a target port selection parameter through downlink control information, the target port selection parameter being used for instructing the terminal to select a demodulation reference signal (DMRS) port identifier.

Optionally, the target port selection parameter is a binary data of 1-6 bits.

Figure 4:
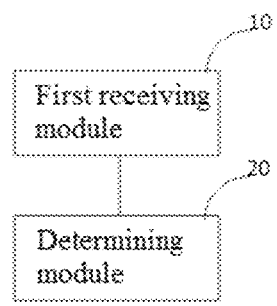
FIG. 4 shows a block diagram of a port configuration device according to an embodiment of the present disclosure.

Referring to FIG. 4, a block diagram of a port configuration device according to an embodiment of the present disclosure is shown.

As shown in FIG. 4, the device comprises:

a first receiving module 10 configured to receive the antenna port configuration parameters, the antenna port configuration parameters being adapted to transmission capability information of a terminal;

a determining module 20 connected to the first receiving module 10, configured to determine, according to the antenna port configuration parameters, an association relationship set between the port selection parameters and the demodulation reference signal (DMRS) port identifiers. Through the above device, after receiving the antenna port configuration parameters sent by the base station, the present disclosure may determine, according to the antenna port configuration parameters, the association relationship set pre-stored in the terminal and adapted to the transmission capability of the current terminal, and after receiving a target port selection parameter sent by the base station, the present disclosure may determine a DMRS port identifier in the association relationship set according to the acquired association relationship set, and configure an antenna port of the terminal using the DMRS port number. The present disclosure determines an association relationship set adapted to a transmission capability of a terminal from the antenna port configuration parameters sent by the base station, and acquires a DMRS port identifier according to the determined antenna port data for configuring the port, thereby avoiding a blind configuration on the port of the terminal, improving efficiency of the terminal configuration, and reducing signaling overhead for the configuration.

Optionally, the antenna port configuration parameters include a demodulation reference signal type parameter, a demodulation reference signal maximum OFDM symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams of the terminal;

wherein the antenna port configuration parameters are configured by the base station according to the apparatus information of the terminal, and are used to select an association relationship set adapted to the transmission capability of the terminal.

Figure 5:
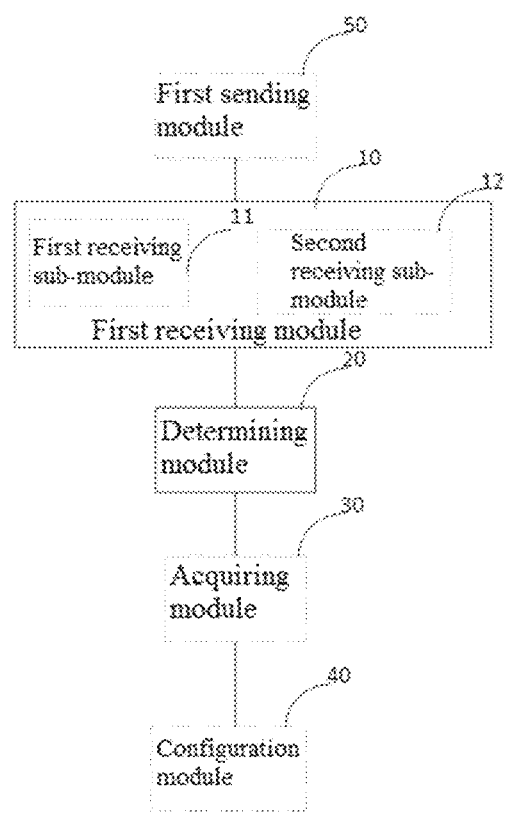
FIG. 5 shows a block diagram of a port configuration device according to an embodiment of the present disclosure.

Referring to FIG. 5, a block diagram of a port configuration device according to an embodiment of the present disclosure is shown.

As shown in FIG. 5, optionally, the device further comprises:

an acquiring module 30 connected to the determining module 20, configured to acquire a target demodulation reference signal (DMRS) port number associated with the target port configuration parameter from the association relationship set;

a configuration module 40 connected to the acquiring module 30, configured to perform a port configuration according to the target DMRS port identifier.

The first receiving module 10 comprises:

a first receiving sub-module 11 configured to receive the antenna port configuration parameters through radio resource control signaling;

a second receiving sub-module 12 configured to receive downlink control information, the downlink control information including a target port selection parameter.

Optionally, the device further comprises:

a first sending module 50 configured to send apparatus information, the apparatus information including an apparatus type of the terminal and the transmission capability information of the terminal.

Figure 6:
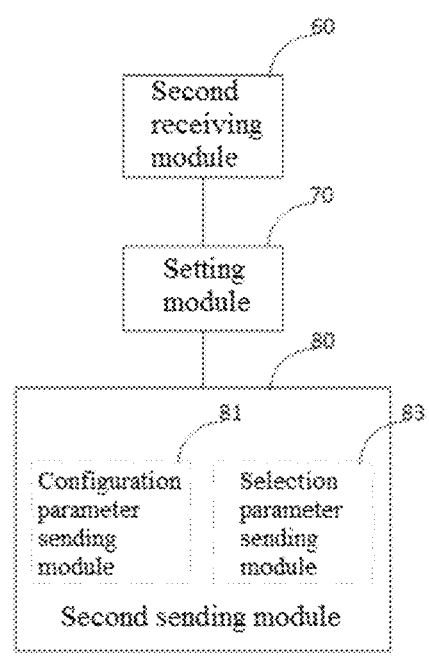
FIG. 6 shows a block diagram of a port configuration device according to an embodiment of the present disclosure.

Referring to FIG. 6, a port configuration device according to an embodiment of the present disclosure is shown.

As shown in FIG. 6, the device comprises:

a second receiving module 60 configured to receive apparatus information of the terminal, the apparatus information including the apparatus type of the terminal and the transmission capability information of the terminal;
a setting module 70 connected to the second receiving module 60, configured to set antenna port configuration parameters for the terminal according to the apparatus information, the antenna port configuration parameters being adapted to the transmission capability information of the terminal;
a second sending module 80 connected to the setting module 70, configured to send the antenna port configuration parameters.

With the above device, the base station described in the present disclosure can configure the antenna port configuration parameters for the terminal and the target port selection parameter for the terminal according to the apparatus information of the terminal, thereby configuring the antenna port of the terminal.

Optionally, the antenna port configuration parameters includes a demodulation reference signal type parameter, a demodulation reference signal maximum OFDM symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams of the terminal;
wherein the antenna port configuration parameters are used by the terminal to select an association relationship set adapted to a transmission capability of the terminal.

Optionally, the second sending module 80 comprises:
a configuration parameter sending sub-module 81 configured to send the antenna port configuration parameters through radio resource control signaling;
a selection parameter sending sub-module 83 configured to send the target port selection parameter through downlink control information, the target port selection parameter being used to instruct the terminal to select a demodulation reference signal (DMRS) port identifier.

Figure 7:
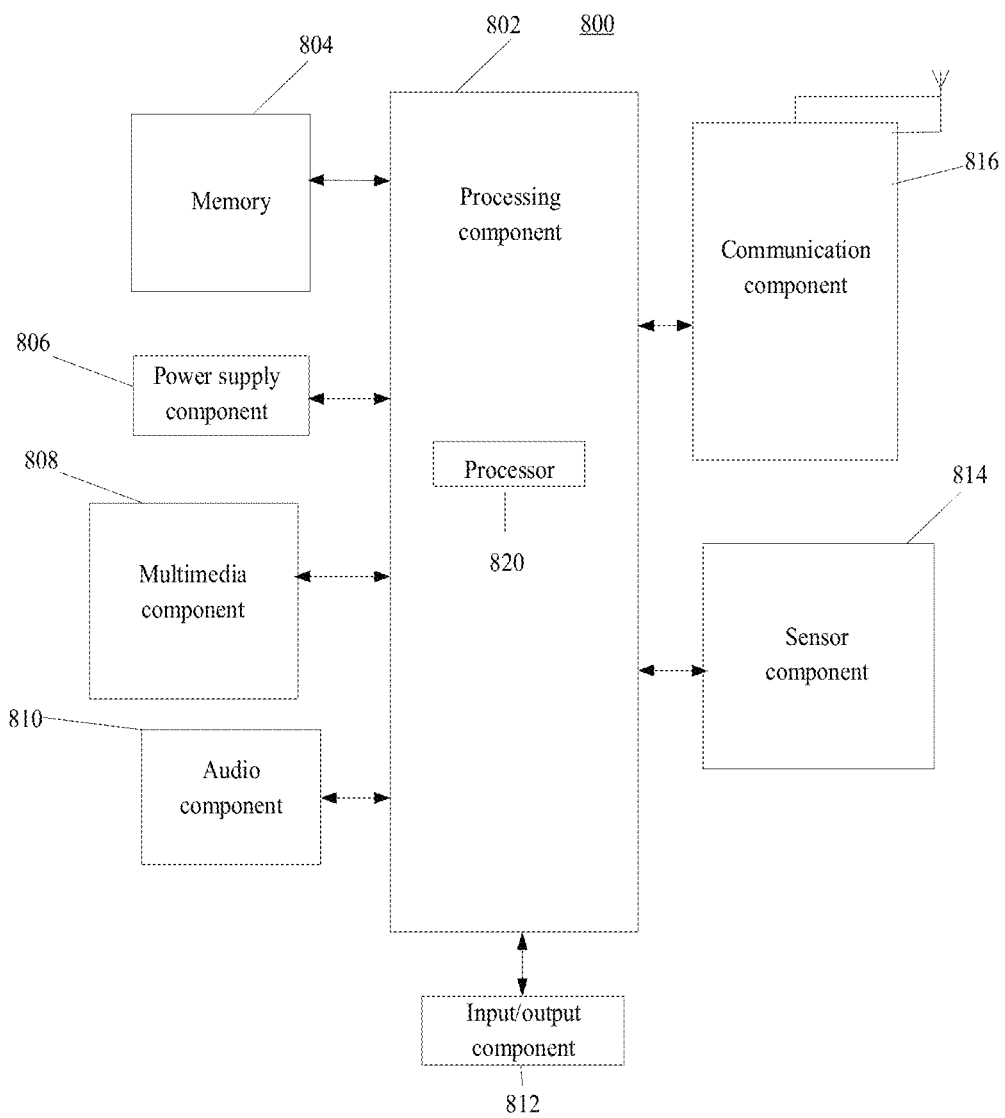
FIG. 7 shows a block diagram of a port configuration device according to an embodiment of the present disclosure.

Referring to FIG. 7, a block diagram of a port configuration device according to an embodiment of the present disclosure is shown. For example, the device 800 may be a mobile phone, a computer, a digital broadcast terminal, a messaging apparatus, a game console, a tablet apparatus, a medical apparatus, a fitness apparatus, a personal digital assistant, and so on.

Referring to FIG. 7, the device 800 may comprise one or more of the following components: a processing component 802, a memory 804, a power supply component 806, a multimedia component 808, an audio component 810, an input/output (I/O) interface 812, a sensor component 814, and a communication component 816.

The processing component 802 generally controls an overall operation of the device 800, such as operations associated with display, telephone call, data communication, camera operation, and recording operation. The processing component 802 may include one or more processors 820 to execute instructions so as to complete all or part of the steps of the method described above. Further, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the device 800. Examples of these data include instructions for any application or method operating on the device 800, contact data, telephone book data, messages, pictures, videos, and so on. The memory 804 may be implemented by any type of volatile or non-volatile storage apparatus, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 806 provides power to various components of the device 800. The power supply component 806 may include a power management system, one or more power supplies, and other components associated with generating, managing, and distributing power for the device 800.

The multimedia component 808 includes a screen providing an output interface between the device 800 and a user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, slide, and gestures on the touch panel. The touch sensor may not only sense a boundary of the touch or slide action, but also detect a duration and pressure associated with the touch or slide action. In some embodiments, the multimedia component 808 includes a front-facing camera and/or a rear-facing camera. When the device 800 is in an operating mode, such as a shooting mode or a video mode, the front-facing camera and/or the rear-facing camera may receive external multimedia data. Each of the front-facing camera and rear-facing camera may be a fixed optical lens system or have focal length and optical zoom capability.

The audio component 810 is configured to output and/or input audio signals. For example, the audio component 810 includes a microphone (MIC) configured to receive an external audio signal when the device 800 is in an operating mode, such as a call mode, a recording mode, and a speech recognition mode. The received audio signal may be further stored in the memory 804 or sent via the communication component 816. In some embodiments, the audio component 810 further includes a speaker for outputting an audio signal.

The I/O interface 812 provides an interface between the processing component 802 and the peripheral interface module, which may be a keyboard, a click wheel, a button, and so on. These buttons may include, but are not limited to, a home button, a volume button, a start button, and a lock button.

The sensor component 814 includes one or more sensors for providing state assessments of various aspects for the device 800. For example, the sensor component 814 may detect an on/off state of the device 800, relative positioning of components, such as the components being a display and a keypad of the device 800; the sensor component 814 may further detect a change in position of the device 800 or one of the components of the device 800, the presence or absence of user contact with the device 800, orientation or acceleration/deceleration of the device 800, and a change in temperature of the device 800. The sensor component 814 may include a proximity sensor configured to detect the presence of a nearby object without any physical contact. The sensor component 814 may also include light sensors, such as CMOS or CCD image sensor, for use in imaging applications. In some embodiments, the sensor component 814 may further include an acceleration sensor, a gyro sensor, a magnetic sensor, a pressure sensor, or a temperature sensor.

The communication component 816 is configured to facilitate wired or wireless communication between the device 800 and other apparatuses. The device 800 may access a wireless network based on a communication standard, such as Wi-Fi, 2G or 3G, or a combination thereof. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology, and other technologies.

In an exemplary embodiment, the device 800 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the methods described above.

In an exemplary embodiment, there is further provided a non-volatile computer-readable storage medium, such as the memory 804 including computer program instructions, which may be executed by the processor 820 of the device 800 to complete the method described above.

The technical solutions of the present disclosure can be applied to 5G (5 generation) communication systems, and can also be applied to 4G and 3G communication systems, and can also be applied to various communication systems in subsequent evolutions, such as 6G and 7G.

The technical solutions of the present disclosure can also be applied to different network architectures including, but not limited to, a relay network architecture, a dual link architecture, and a Vehicle-to-Everything (communication of a vehicle to any object) architecture.

The 5G CN described in the embodiments of the present disclosure may also be referred to as a new core network, or a 5G NewCore, or a next generation core (NGC), and so on. The 5G-CN is set independently of core network, such as an evolved packet core EPC).

In the embodiment of the present disclosure, a base station (BS), which may also be referred to as a base station apparatus, is a device deployed in a radio access network to provide a wireless communication function. For example, an apparatus providing a base station function in a 2G network includes a base transceiver station (BTS) and a base station controller (BSC); an apparatus providing a base station function in a 3G network includes a NodeB and a radio network controller (RNC); an apparatus providing a base station function in a 4G network includes an evolved NodeB (eNB); an apparatus providing a base station function in a wireless local area networks (WLANs) is an access point (AP); an apparatus providing a base station function in a 5G New Radio (NR) includes a continuously evolved NodeB (gNB), and an apparatus providing a base station function in a future new communication system, and so on.

In the embodiments of the present disclosure, a terminal may refer to various forms of User Equipment (UE), an access terminal, a subscriber unit, a subscriber station, a rover station, a mobile station (MS), a remote station, a remote terminal, a mobile apparatus, a user terminal, a terminal equipment, a wireless communication apparatus, a user agent or a user device. The terminal equipment may also be a cellular phone, a cordless phone, a Session Initiation Protocol (SIP) phone, a Wireless Local Loop (WLL) station, a Personal Digital Assistant (PDA), a handheld apparatus having a wireless communication function, a computing apparatus or another processing apparatus connected to a wireless modem, a vehicle-mounted apparatus, a wearable apparatus, a terminal apparatus in a future 5G network, a terminal apparatus in a future evolved Public Land Mobile Network (PLMN), or the like. There is no limitation thereto in the embodiments of the present disclosure.

In the embodiments of the present disclosure, a unidirectional communication link from an access network to a terminal is defined as a downlink, data transmitted on the downlink is defined as downlink data, and a transmission direction of the downlink data is defined as referred to as a downlink direction; while a unidirectional communication link from the terminal to the access network is defined as an uplink, data transmitted on the uplink is defined as uplink data, and a transmission direction of the uplink data is defined as an uplink direction.

It should be understood that the term "and/or" herein is merely an association relationship describing the associated objects, which indicates that there may be three kinds of relationships. For example, A and/or B may indicate three cases of A alone, A and B together, and B alone. In addition, the character "/" herein indicates that the associated objects before and after are in a "or" relationship.

The term "a/the plurality of" appearing in the embodiments of the present disclosure refers to two or more.

The descriptions such as first, second and so on appearing in the embodiments of the present disclosure are used merely for the purpose of illustrating and distinguishing the described objects with no distinction of order, which neither indicate the particular limitation on the number of apparatuses in the embodiments of the present disclosure, nor can constitute any limitation on the embodiments of the present disclosure.

The term "connect/connection" appearing in embodiments of the present disclosure refers to various connection ways such as direct connection or indirect connection to implement communication between apparatuses. There is no limitation thereto in the embodiments of the present disclosure.

The terms "network" and "system" appearing in the embodiments of the present disclosure express the same concept, and the communication system is the communication network.

It should be understood that, in various embodiments of the present disclosure, the sequence numbers of each of the above processes does not imply the precedence of the order of execution, and the order of execution of each of the processes should be determined according to its functions and internal logic, and should not constitute any limitation on the implementation process of the embodiments of the present disclosure.

In the several embodiments provided by the present disclosure, it should be understood that the disclosed methods, devices, and systems may be implemented in other ways. For example, the device embodiments described above are merely schematic. For example, the division of the units is merely a division of logical functions, and there may be other ways of division in actual implementation. For example, a plurality of units or components may be combined or integrated into another system, or some features may be ignored or not performed. In another aspect, the displayed or discussed coupling or direct coupling or communication connection with respect to each other may be indirect coupling or communication connection through some interfaces, devices or units, and may be in electrical, mechanical or other forms.

The units described as separate means may or may not be physically separate, and the means displayed as units may or may not be physical units, i.e. may be located in one place, or may be distributed over a plurality of network units. Some or all of the units may be selected according to actual needs to achieve the objectives of the solutions of the present embodiment.

In addition, in each of the embodiments of the present disclosure, each of the function units may be integrated into one processing unit, or each of the units may be separately physically included, or two or more units may be integrated into one unit. The above integrated unit may be implemented in the form of both hardware and hardware plus software functional units.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A port configuration method, the method comprising:
   receiving antenna port configuration parameters, the antenna port configuration parameters being adapted to transmission capability information of a terminal; and
   determining, based on the antenna port configuration parameters, an association relationship set between port selection parameters and demodulation reference signal (DMRS) port identifiers,
   wherein the antenna port configuration parameters include a demodulation reference signal type parameter, a demodulation reference signal maximum orthogonal frequency division multiplexing (OFDM) symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams for the terminal.

2. The method according to claim 1, wherein after determining, based on the antenna port configuration parameters, the association relationship set between the port selection parameters and the demodulation reference signal (DMRS) port identifiers, the method further comprises:
   receiving a target port configuration parameter;
   acquiring a target demodulation reference signal (DMRS) port identifier associated with the target port configuration parameter from the association relationship set; and
   performing a port configuration based on the target DMRS port identifier.

3. The method according to claim 1, wherein before receiving the antenna port configuration parameters, the method further comprises:
   sending apparatus information, the apparatus information including an apparatus type of the terminal and the transmission capability information of the terminal.

4. The method according to claim 1, wherein said receiving the antenna port configuration parameters comprises receiving radio resource control signaling, the radio resource control signaling including the antenna port configuration parameters.

5. The method according to claim 2, wherein said receiving the target port configuration parameter comprises:
   receiving downlink control information, the downlink control information including a target port selection parameter.

6. The method according to claim 5, wherein the target port selection parameter is binary data whose number of bits is greater than or equal to 1 and less than or equal to 6.

7. A port configuration device, comprising a memory and a processor, the memory storing computer instructions, wherein the computer instructions cause the processor to:
   receive antenna port configuration parameters, the antenna port configuration parameters being adapted to transmission capability information of a terminal; and
   determine, based on the antenna port configuration parameters, an association relationship set between port selection parameters and demodulation reference signal (DMRS) port identifiers,
   wherein the antenna port configuration parameters include a demodulation reference signal type parameter, a demodulation reference signal maximum OFDM symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams of the terminal.

8. The device according to claim 7, wherein the computer instructions further cause the processor to:
   receive a target port configuration parameter;
   DMRS port identifier associated with the target port configuration parameter from the association relationship set; and
   perform a port configuration based on the target DMRS port identifier.

9. The device according to claim 7, wherein the computer instructions further cause the processor to:
   send apparatus information before receiving the antenna port configuration parameters, the apparatus information including an apparatus type of the terminal and the transmission capability information of the terminal.

10. The device according to claim 7, wherein the computer instructions further cause the processor to:
    receive the antenna port configuration parameters through radio resource control signaling.

11. The device according to claim 8, wherein the computer instructions further cause the processor to:

receive downlink control information, the downlink control information including a target port selection parameter.

12. The device according to claim 11, wherein the target port selection parameter is a binary data of a number of bits greater than or equal to 1 and less than or equal to 6.

13. A non-transitory computer readable storage medium having stored thereon computer program instructions, wherein the computer program instructions cause a processor to:

receive antenna port configuration parameters, the antenna port configuration parameters being adapted to transmission capability information of a terminal; and determine, based on the antenna port configuration parameters, an association relationship set between port selection parameters and demodulation reference signal (DMRS) port identifiers, wherein the antenna port configuration parameters include a demodulation reference signal type parameter, a demodulation reference signal maximum OFDM symbol length parameter, and a number-of-transport-stream configuration parameter, wherein the demodulation reference signal type parameter and the demodulation reference signal maximum OFDM symbol length parameter are used to configure a pattern of a demodulation reference signal, and the number-of-transport-stream configuration parameter is used to determine a maximum number of transport streams of the terminal.

14. The non-transitory computer readable storage medium according to claim 13, wherein the computer program instructions further cause the processor to:

receive a target port configuration parameter;

acquire a target DMRS port identifier associated with the target port configuration parameter from the association relationship set; and perform a port configuration based on the target DMRS port identifier.

15. The non-transitory computer readable storage medium according to claim 13, wherein the computer program instructions further cause the processor to:

send apparatus information before receiving antenna port configuration parameters, the apparatus information including an apparatus type of the terminal and the transmission capability information of the terminal.

16. The non-transitory computer readable storage medium according to claim 13, wherein the computer program instructions further cause the processor to:

receive the antenna port configuration parameters through radio resource control signaling.

17. The non-transitory computer readable storage medium according to claim 14, wherein the computer program instructions further cause the processor to:

receive downlink control information, the downlink control information including a target port selection parameter.

* * * * *

UNITED STATES PATENT AND TRADEMARK OFFICE
CERTIFICATE OF CORRECTION

| | | |
|---|---|---|
| PATENT NO. | : 12,368,636 B2 | Page 1 of 1 |
| APPLICATION NO. | : 17/422140 | |
| DATED | : July 22, 2025 | |
| INVENTOR(S) | : Miao et al. | |

It is certified that error appears in the above-identified patent and that said Letters Patent is hereby corrected as shown below:

On the Title Page

Item (72) Inventors section:
Please replace "Runqua Miao" with -- Runquan Miao --.

Signed and Sealed this
Twenty-first Day of October, 2025

John A. Squires
*Director of the United States Patent and Trademark Office*